United States Patent [19]

Sonn et al.

[11] 3,784,393
[45] Jan. 8, 1974

[54] PIGMENTED PLASTICS
[75] Inventors: George Frank Sonn, Edison; Frank Michael McGonigle, South Plainfield, both of N.J.
[73] Assignee: Inmont Corporation, New York, N.Y.
[22] Filed: June 1, 1971
[21] Appl. No.: 148,979

[52] U.S. Cl. ...... 106/288 Q, 106/193 J, 106/193 P, 106/196, 106/309
[51] Int. Cl. .......................................... C08h 17/02
[58] Field of Search ............. 106/288 Q, 308 Q, 106/309, 193 J, 193 P, 193 D, 193 M, 196

[56] References Cited
UNITED STATES PATENTS

| | | |
|---|---|---|
| 2,701,211 | 2/1955 | Taylor et al. ............... 106/193 D |
| 2,544,363 | 3/1951 | Siemons ..................... 106/193 J |
| 2,761,789 | 9/1956 | Locher et al. ............... 106/193 D |
| 3,554,774 | 1/1971 | Hewitt et al. ............... 106/196 |

Primary Examiner—Delbert E. Gantz
Assistant Examiner—S. Berger
Attorney—F. W. Wyman and P. R. Arvidson

[57] ABSTRACT

Compositions containing pigment, cellulose triacetate, and small amounts of high boiling solvents are prepared for use as concentrates for coloring cellulose triacetate solutions prior to spinning of yarns and filaments from the solution.

7 Claims, No Drawings

PIGMENTED PLASTICS

This invention relates to pigmented cellulose triacetate compositions. More particularly, the invention relates to a method for the production of pigmented cellulose triacetate compositions suitable for spinning of yarns and filaments.

In the spinning of yarns or filaments from solutions of cellulose triacetate wherein pigments are dispersed in the solution to color the resulting yarns, it has been difficult to obtain adequate dispersion of the pigment in the spinning solution, or dope, by conventional methods. A major problem has been that the pigment is not broken down to a fine enough particle size to pass through the spinnerts.

The present invention provides a method for dispersing pigments in cellulose triacetate solutions which greatly alleviates the above problem. In accordance with the invention a concentrate premix is first prepared comprising a relatively high percentage of pigment, cellulose triacetate, and a mixture of high boiling and low boiling solvents, by conventional mixing as in a sigma blade type dough mixer until all lumps are broken up and the mixture is uniformly blended. The premix is then milled on an open plastic milling device such as a two roll mill until the mixture begins to blister and does not stick to the rolls. The mixture is removed from the mill, pulverized, and used to color solutions of cellulose triacetate prior to spinning or extruding the solution to form fibers or filaments. The concentrated premix of pigment and plastic can be uniformly dispersed in the cellulose triacetate spinning solution by simple mixing such as by using a paddle mixer with slow agitation. In a preferred embodiment of the invention secondary cellulose acetate, up to an amount equal to the cellulose triacetate, can be used in the premix. The resulting concentrated pigment dispersions generally contain 25 to 60 percent pigment, 2 to 12 percent solvent, and 30 to 60 percent cellulose triacetate or mixture of the triacetate and secondary acetate.

A test that is suitable for determining whether the concentrates pigment dispersion can be used to pigment cellulose triacetate spinning solutions consists of measuring the filterability of the concentrate dispersion. In the filterability test a 700 gram sample of the dispersion is adjusted to 8 percent solids by addition of a solvent mixture consisting of 10 percent methanol and 90 methylene chloride. The diluted dispersion is then filtered through a standard filter cloth disc under 200 P.S.I. nitrogen pressure. The filterability may be expressed in grams or in percentage. Thus, if all of the dispersion filters through the filter the filterability is 700 grams or 100 percent. Dispersions having a filterability of 250 grams or higher are operable for pigmenting cellulose triacetate spinning solutions.

The pigment dispersions must be usuable in the spinning or extruding process without appreciably affecting the resulting fiber or filament except to color it.

Secondary cellulose acetate, as used herein, means cellulose acetate having 52 percent to 56 percent acetyl groups, or "combined acetic acid" by weight. These secondary acetates are available on the market in various grades and viscosities and any of these can be used in the present invention.

High boiling volatile solvents, as used herein, means volatile solvents that have boiling points on the order of about 100°C. and above. These solvents must be solvents for cellulose triacetate, and when mixed with low boiling solvents the mixture should be a solvent for cellulose triacetate. Also, when secondary cellulose acetate is used in making the concentrate, these high boiling solvents alone, and in mixtures with the low boiling solvent, must be a solvent for secondary cellulose acetate. Suitable solvents include: diacetone alcohol, methyl pyrolidone, isophorone, cyclohexanone, and triacetin (glycerol triacetate). Diacetone alcohol is especially preferred because of its solvency properties and also because of economy, its odor and low toxicity.

Low boiling volatile solvents, as used herein, means volatile solvents for cellulose triacetate and secondary cellulose acetate, at least in mixtures with the high boiling solvent, that having a boiling point on the order of about 35°C to about 95°C. Suitable solvents include: acetone, methyl acetate, ethyl acetate, methyl ethyl ketone, methylene chloride, etc. Acetone is especially preferred because of economy, ease of handling, and toxicological considerations.

It should be noted that the real limitation as to the mixture of solvents employed in the invention is whether or not the mixture is a solvent for cellulose triacetate, or a mixture of cellulose triacetate and secondary acetate. Those skilled in the art can readily appreciate that it is possible to predict which combinations of solvents will be operable based on solubility parameters and hydrogen bonding properties of the solvents. For instance, it is known that cellulose triacetate and secondary acetate are soluble in poor hydrogen bonding solvents having solubility parameters of the order of 9 to 13. Low hydrogen bonding solvents include: aliphatic and aromatic solvents, chlorinated hydrocarbons and nitrohydrocarbons. Similarly, it is known that cellulose triacetate and secondary acetate are soluble in moderately hydrogen bonded solvents having solubility parameters of the order of 9.5 to 9.9 for cellulose triacetate and 9.0 to 13 for secondary acetate. Moderately hydrogen bonded solvents include, for example, esters, ethers and ketones. Also, it is know that cellulose triacetate and secondary cellulose acetate are soluble in strongly hydrogen bonded solvents having solubility parameters of the order of 10.0 to 10.8. Strongly hydrogen bonded solvents include amides, alcohols, amines and acids. Finally, it can also be noted that mixtures of solvents whose individual solubility parameters may be outside the above ranges can be solvents for cellulose triacetate and secondary acetate if the mixture has the proper solubility parameter. For instance, methanol which has a solubility parameter of 14.5 can be used with methylene chloride, solubility parameter of 9.7 to dissolve cellulose triacetate.

Pigments that can be used in the invention include those or organic nature such as phthalocyanine blue, phthalocyanine green, quinacridones, perylene tetracarboxylic acid di-imides, dioxazines, perinones disazo pigments and anthraquinone pigments. Also inorganic pigments can be used, e.g., carbon black, titanium dioxide, metal powders, iron oxide and ultramarine. Mixtures of two or more pigments can, of course be used. The pigment must, of course, be stable to the heat used in the spinning process. Preferably the concentrate contains 25 to 60 percent pigment.

Other conventional additives may be included in either the concentrate pigment dispersion or the spinning dope if desired. Such additives include optical brighteners, softening agents, stablizers, etc.

During the plastic milling of the premix on an open mill, most of the more volatile solvent contained in the dispersion evaporates. It is believed that this gradual evaporation of solvent during milling of the dispersion contributes greatly to the high degree of dispersion obtained. However, evaporation of volatile solvent is not the only factor responsible because, using the highly volatile solvent alone without using any high boiling solvent, the high degree of dispersion obtainable by the invention are not obtainable. On the other hand, milling of the concentrate in the absence of the low boiling, highly volatile solvent, does not give the desirable results of the invention. If desired, additional small portions of solvent mixture, or small portions of low boiling solvent can be added during milling to obtain improved processing on the two roll mill.

The following examples in which the parts are by weight are given to further illustrate the invention.

Example 1

| | |
|---|---|
| Irgazin Red Pigment, a disazo pigment | 34.8 parts |
| Low viscosity secondary cellulose acetate | 18.1 parts |
| Cellulose Triacetate, (combined acid 61.8%) | 18.1 parts |
| Acetone, B. P. 56°C | 23.2 parts |
| Diacetone alcohol, B. P. 169°C | 5.8 parts |
| Total | 100.0 parts |

The above ingredients were premixed in a sigma blade dough mixer until uniform and then milled on a 2-roll rubber mill until it began to blister and would no longer stay on the rolls. The resulting dispersion contained 48 percent pigment, by weight, 24 percent cellulose triacetate, 24 percent secondary cellulose acetate, and 4 percent solvent consisting essentially of diacetone alcohol. The filterability of the dispersion was 300 grams. The dispersion was useful to pigment cellulose triacetate spinning dopes prior to extrusion into fibers; it was readily and uniformly blended with the dope by simple paddle mixing in any desired ratio of, for example, up to 10 parts of concentrate to 90 parts of dope, without adversely affecting fiber properties. Cellulose triacetate solutions containing 20 percent to 30 percent by weight of cellulose triacetate are generally used for spinning.

Example 2

| | Parts |
|---|---|
| Phthalocyanine Blue | 34.8 |
| Cellulose triacetate | 18.1 |
| Secondary acetate | 18.1 |
| Triacetin, B. P. 258°C. | 12.0 |
| Methyl acetate, B. P. 57°C. | 17.0 |

The above ingredients were premixed and milled as in Example 1 to obtain a concentrate dispersion containing about 43.5 percent pigment, 22.5 percent cellulose triacetate, 22.5 percent secondary acetate, and 11.5 percent solvent consisting essentially of triacetin. The filterability of the dispersion was 350 grams. The dispersion was used to pigment cellulose triacetate spinning dopes prior to extrusion into fibers.

Example 3

| | Parts |
|---|---|
| Carbon Black | 34.8 |
| Cellulose triacetate | 34.2 |
| Methyl pyrrolidone | 8.0 |
| Ethyl acetate, B. P. 77°C. | 23.0 |

The above ingredients were premixed and milled as in Example 1 to obtain a concentrate dispersion containing about 48 percent carbon black, 48 percent triacetate and 4 percent solvent consisting essentially of methyl pyrrolidone. The dispersion had a filterability of 450 grams and was useful to pigment cellulose triacetate spinning dopes prior to extrusion into fibers.

It will be understood that the practice of the invention is not limited to the dispersions described in the specific examples, but that various modifications may be made therein without departing from the scope of the invention as it is defined in the appended claims.

What is claimed is:

1. A process for preparing concentrated pigment dispersions suitable for pigmenting cellulose triacetate spinning solution, said processing comprising (1) forming a premix comprised of pigment, cellulose triacetate or a mixture of cellulose triacetate with up to an equal amount of secondary cellulose acetate, and volatile solvent in an amount sufficient to enable the premix to be milled on an open plastic milling machine, said volatile solvent consisting of a mixture of volatile solvent having a boiling point within the range of about 35°C to 95°C, and volatile solvent having a boiling point above 100°C, and (2) plastic milling the premix on an open mill until it begins to blister and no longer adhers to the mill, to form said dispersion consisting essentially of 25 to 60 percent pigment, 2 to 12 percent solvent and 30 to 60 percent cellulose triacetate or mixture of cellulose triacetate and up to an equal amount of secondary cellulose acetate.

2. A process as in claim 1 which includes a final step of pulverizing the dispersion.

3. A process as in claim 1 wherein secondary cellulose acetate is included in the premix up to an amount equal to the amount of cellulose triacetate.

4. A process as in claim 3 which includes a final step of pulverizing the dispersion.

5. A process for preparing concentrate pigment dispersions suitable for pigmenting cellulose triacetate spinning solutions, said process comprising (1) forming a premix comprised of pigment, cellulose triacetate or a mixture of cellulose triacetate with up to an equal amount of secondary cellulose acetate, and volatile solvent in an amount sufficient to enable the premix to be milled on an open plastic milling machine, said volatile solvent consisting of a mixture of volatile solvent having a boiling point within the range of about 35°C. to 95°C., and high boiling solvent having a boiling point above 100°C., and (2) plastic milling the premix on an open mill until substantially all of the low boiling solvent evaporates and the resulting dispersion has a filterability of at least 250 grams, said dispersion consisting essentially of 25 to 60 percent pigment, 2 to 12 percent solvent and 30 to 60 percent cellulose triacetate or mixture of cellulose triacetate and up to an equal amount of secondary cellulose acetate.

6. A process as in claim 5 wherein secondary cellulose acetate is included in the premix up to an amount equal to the amount of cellulose triacetate.

7. A process as in claim 6 which includes a final step of pulverizing the dispersion.

* * * * *